United States Patent [19]

Carolus et al.

[11] Patent Number: 5,011,561

[45] Date of Patent: Apr. 30, 1991

[54] LABELLING MACHINE

[75] Inventors: Jean-Claude Carolus, Marcq-en-Baroeul; Francois Delvinquiere, Lys-lez-Lannoy, both of France

[73] Assignee: Nord Techniques Etiquetage - SARL, Roubaix, France

[21] Appl. No.: 423,878

[22] Filed: Oct. 19, 1989

[30] Foreign Application Priority Data

Oct. 21, 1988 [FR] France ................................ 88 14837

[51] Int. Cl.5 ................................................ B32B 31/00

[52] U.S. Cl. .................................... 156/495; 156/541; 156/542; 156/566; 156/361; 242/75.43

[58] Field of Search ............... 156/495, 541, 542, 579, 156/DIG. 33, 361, 566; 242/75.3, 75.4, 75.43

[56] References Cited

U.S. PATENT DOCUMENTS

| | | | |
|---|---|---|---|
| 3,113,904 | 12/1963 | Phipps | 156/542 X |
| 3,398,914 | 8/1968 | Cunningham | 242/75.43 |
| 4,547,250 | 10/1985 | Murayama | 156/542 X |
| 4,711,687 | 12/1987 | Paules | 156/542 X |
| 4,869,775 | 9/1989 | Quittner | 156/542 X |

*Primary Examiner*—Michael W. Ball
*Assistant Examiner*—Mark A. Osele
*Attorney, Agent, or Firm*—Ladas & Parry

[57] ABSTRACT

A labelling machine has a supply reel, supplying a band carrying labels, a receiving reel for the band after stripping of the labels, a distribution plate placed close to two deviating bars for deviating the band so that the band forms a sharp angle in its path between the first deviating bar, the distribution plate and the second deviating bar, and a band pulling system placed after the second deviating bar. An arm has on one end the first deviating bar, and is mounted for pivoting about a first pin. A lever carries a stop member and the first pin, and is mounted for pivoting about a second pin, fixed on the frame of the machine. A first return means is fastened to the pivoting lever and the frame of the machine and is capable of causing the lever to pivot about the second pin so that the stop member is directly or indirectly applied on the pivoting spindle of the supply reel. A second return means is fastened to the pivoting lever and the arm, and is capable of causing the arm to pivot about the first pin, in such a way as to bring the first deviating bar closer to the stop member. Another stop member limits the pivoting of the arm.

1 Claim, 2 Drawing Sheets

LABELLING MACHINE

FIELD OF THE INVENTION

The present invention relates to the labelling of articles using a continuous band constituted of a non-adhesive silicon-coated type base material carrying the labels. It relates more particularly to an automatic labelling machine in which the band carrying the labels is unrolled and driven over a distribution plate according to a sharp angle, in such a way that the label is stripped from the band when the latter is driven over the edge of the plate, and can then be fixed on an article.

BACKGROUND OF THE INVENTION

Labelling machines of this type are equipped, not only with means of unrolling the band which is wound on a supply reel, but also means of winding up the band from which the labels have been stripped after its passage over the distribution plate. In addition, the sharp angle at the level of the distribution plate is formed by driving the band over at least two deviating bars placed close to said plate and in such a way as to deviate the band from its path running from the supply reel towards the receiving reel.

The aforesaid band moving means assembly is controlled in relation to the way in which the articles to be labelled are presented, generally by means of a mechanical or opto-electronical sensor, provided at the level of the conveyor on which said articles are moved.

Such a machine is further equipped with extra accessories provided for slowing down the unrolling of the supply reel, for adjusting the tension of the band particularly when said band reaches the part between the two deviating bars and the distributing plate so that the band remains stretched and that the labels can be stripped from their non-adhesive base in the best conditions, even if the progression of the band is jerky, such accessories consist in particular in multiple tension rollers for tensioning the band, or flexible bars which are applied against the band, etc.

Therefore, the conventional labelling machine of this type which the Applicant knows of have a complicated and bulky structure due especially to the presence of all the aforesaid accessories provided on the path of the band.

Another labelling device is known from U.S. Pat. No. 3,113,904 in which the label stripping device consists in a heated print wheel and not in a sharp-angled distribution plate. Nonetheless, said device is equipped with a brake assembly acting on the feeding of the band. Said brake assembly is composed of a brake-pad which can be applied against a drum fast with the spindle of the supply reel, of a pivotable bent lever carrying at one end the brake-pad and at the other end a guide roller for the band, and finally of a draw spring which is fast with a lever and which tends to apply the pad on the drum. In operation, the displacement of the band induced by a toothed wheel creates a tension on the band and, correlatively, causes the guide roller to move and the lever to pivot. Such pivoting movement of the lever releases the pad which was in contact with the drum, and enables the reel to turn around its spindle, hence causing the band to move forward.

This system, however, works jerkily and is not entirely satisfactory.

SUMMARY OF THE INVENTION

A labelling machine has now been found, and this is the object of the present invention, which eliminates the aforesaid drawbacks in that, on the one hand, it has a reduced number of members whose disposition can be very compact, and on the other hand, the braking system is a double-acting one.

Conventionally, the labelling machine comprises a supply reel for a band carrying labels, a receiving reel for winding up the band after stripping of the labels, a distribution plate placed close to two deviating bars, deviating the band so that it forms a sharp angle in its path between the first deviating bar, the distribution plate and the second deviating bar, and a band pulling system placed after the second deviating bar. According to the invention, the machine comprises:

(a) an arm on one end of which is fixed the first deviating bar, said arm being mounted for pivoting about a first pin, (b) a piece on which are mounted, on the one hand a stop member, and on the other hand, the first pin, said piece being itself mounted for pivoting about a second pin, fixed on a frame of the machine, (c) a first return means, fast with the pivoting piece and the frame of the machine and capable of causing the piece to pivot about the second pin so that the stop member is directly or indirectly applied on a pivoting spindle of the supply reel, (d) a second return means, fast with the pivoting piece and the arm, and capable of causing the arm to pivot about the first pin, in such a way as to bring the first deviating bar closer to the stop member, and (e) another stop member to restrict the pivoting movement thereof about the first pin.

Thus according to the invention, braking of the supply reel and tensioning of the band throughout its travelling path between the deviating bars and the distribution plate, are achieved due to two pivoting actions, firstly that of the piece on which is mounted the first deviating bar, and secondly that of the lever causing the application or release of the stop member blocking the rotation of the spindle of the supply reel.

Preferably, the supply reel rotating spindle is fast with a circular flange whose edge faces the stop member.

According to the particular disposition of the invention, it is possible to dissociate the supply reel braking function which is achieved by the stop member under the action of the return means associated to the pivoting piece, from the band tensioning function, which is achieved by the displacement of the first deviating bar under the action of the return means associated to the pivoting arm.

BRIEF DESCRIPTION OF THE DRAWINGS

The invention will be more readily understood on reading the following description given with reference to the accompanying drawings, in which.

DETAILED DESCRIPTION OF THE PREFERRED EMBODIMENTS

Figure 1:
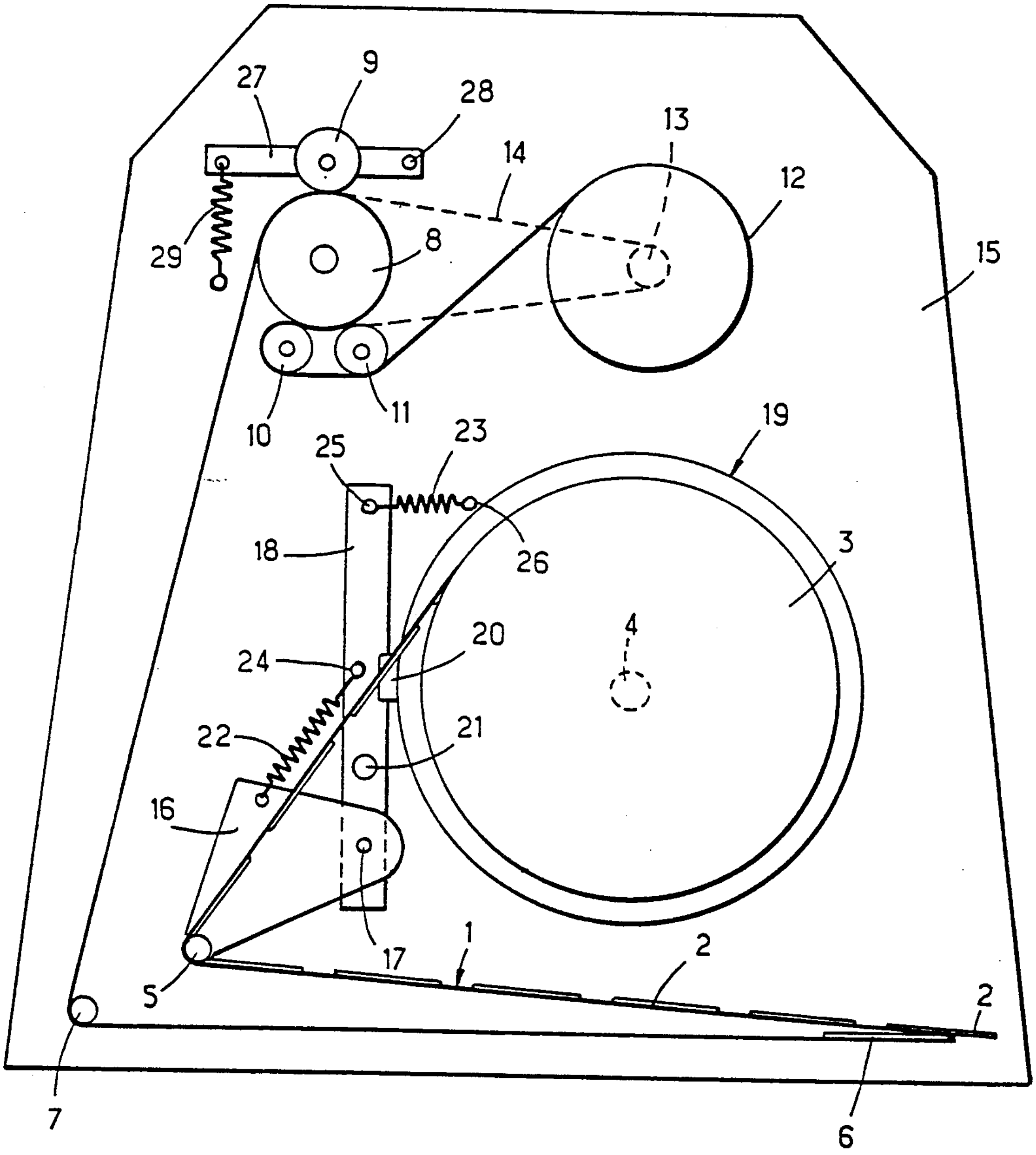
FIG. 1 is a diagrammatical side view of the principal members of the machine, when the band is stopped.

The band 1 carrying the labels 2 is fed from a supply reel 3 mounted on a spindle 4. The spindle 4 is free-rotatable and the reel 3 is rigidly fixed on said spindle 4, for example by way of a mandrel of which one part made of soft rubber is deformable by screwing of a threaded pin. The band 1 fed from the reel 3 is driven over a first deviating bar 5, a distribution plate 6 and a second deviating bar 7; said band is pulled by a tensioning device which, in the illustrated example, comprises a main roller 8 in rubber, against which is applied a back pressure-roller 9 in metal whose surface is grooved, and two rollers 10, 11 in rubber placed tangentially under the main roller 8. The rotation spindle of the back-pressure roller 9 is mounted on a plate 27 of which one end is fast with a pivot pin 28 fitted in the vertical upright 15 of the machine frame, while the other end is fast with a first draw-spring 29 anchored in said upright 15, so that the back-pressure roller 9 tends to be applied against the main roller 8. The band 1 is wound on the receiving reel 12 mounted on a spindle 13. The main roller 8 is driven in rotation by driving means, not shown, and drives in rotation by the spindle 13 of the receiving reel 12 for example by means of a belt 14.

The spindles 4, 13 of the reels, the spindles of cylinders 8, 9, 10, 11, and the deviating bars 5, 7 are parallel to each other and perpendicular to the vertical upright 15 of the machine frame.

As illustrated in FIG. 1, the receiving reel 12, situated immediately above the supply reel 3, and said supply reel 3, are placed close to the distribution plate 6, above and between the first deviating bar 5 and the plate 6.

In this way, the band 1 fed from the reel 3 winds around part of the periphery of the bar 5 before reaching the plate 6. The first deviating bar 5 is mounted on one end of an arm 16 whose other end is fast with a pin 17 which is part of the lever 18. A circular flange 19, of small thickness is fixed on the spindle 4 of the supply reel 3. The lever 18 is situated directly next to the flange 19, and comprises a stop member 20 and a pivot pin 21 fast with the upright 15 of the frame. The pin 17 joining the arm 16 and the lever 18 is positioned on lever 18 under pivot pin 21 of the lever 18 whereas stop member 20 is situated above said pin 21. A second draw-spring 22 connects the arm 16 with the lever 18, a third draw-spring 23 connecting the lever 18 with the upright 15. The anchoring points 24, 25 of draw-springs 22, 23 respectively on the lever 18 are situated at the upper part of said lever, above pivot pin 21; anchoring point 24 of second draw-spring 22 on lever 18 is approximately level with stop member 20, and anchoring point 25 of third draw-spring 23 on lever 18 is at the upper end of lever 18. Anchoring point 26 of third draw-spring 23 on upright 15 is situated in the opposite direction to the first deviating bar 5, on the right in the FIG. 1.

The labelling machine is also equipped with conventional means, not shown in the drawings, i.e. a conveyor for the articles to be labelled, sensors for detecting the presence of an article at the level of the distribution plate 6 and for stopping the conveyor and setting the main roller 8 and the receiving reel 12 in rotation.

The machine works as follows. FIG. 1 corresponds to the position in which the band is not moving. Band 1, when not moving exerts no tension on the first deviating bar 5. Draw-springs 22, 23 of arm 16 and lever 18, respectively, are in rest position, compressed to a maximum. Stop member 20 is applied against the edge of flange 19, spindle 4 of supply reel 3 being locked in position and reel 3 being immobilized.

Figure 2:
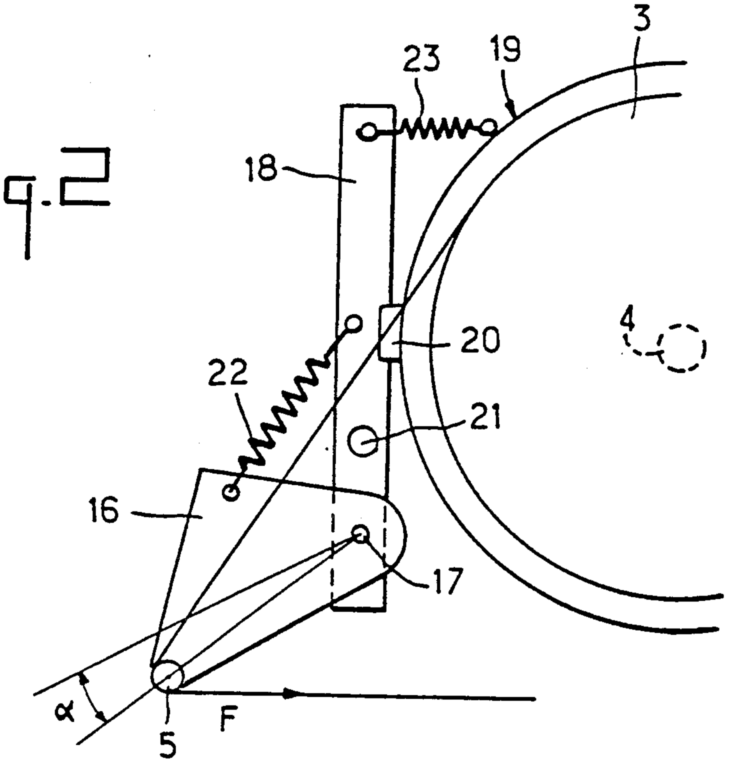
FIG. 2 is a partial diagrammatical view of the machine, when the band is tensioned.
Figure 3:
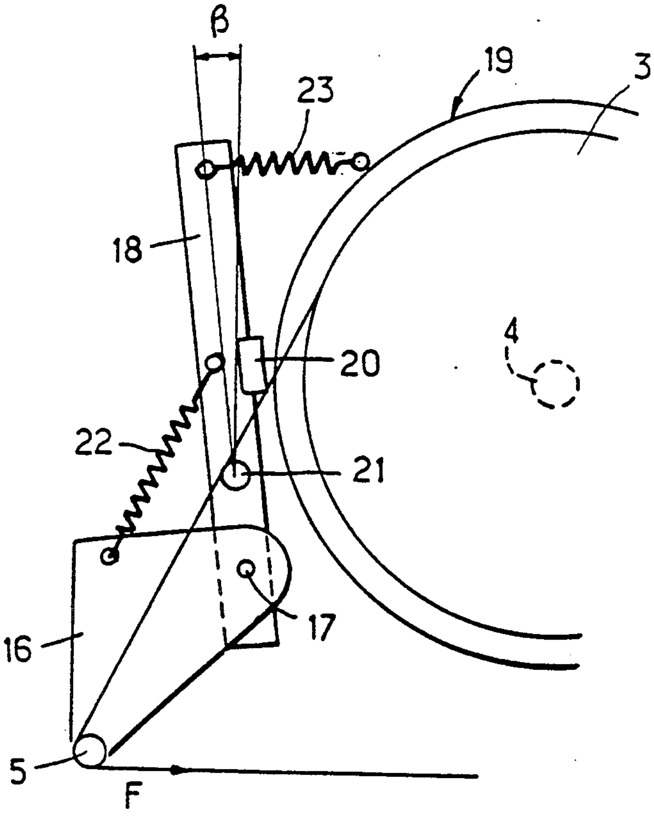
FIG. 3 is the same partial diagrammatical view of the machine, when the band is being moved forward.

FIG. 2 illustrates the movements of the various members provided for tensioning and braking the band 1 when the latter starts moving, after the main roller 8 and the receiving reel 12 have been set in rotation. The rotation of main roller 8 causes the tensioning of band 1, resulting in the displacement of the first deviating bar 5 in the direction of arrow F; said displacement corresponds to the pivoting movement of pin 17 joining the arm 16 and the lever 18, over an angle $\alpha$; the forces exerted on the bar 5 are compensated by the extension of draw-spring 22.

The strength of the draw-spring 22 is less than the strength of the draw-spring 23 so that the draw-spring 23 will not extend until the draw-spring 22 reaches its maximum extension.

Once the draw-spring 22 has reached its maximum extension, or once angle $\alpha$ has reached a given value materialized by another stop member 2, and as the tension exerted on band 1 increases as a result of the rotation of the main roller 8, the displacement of the first deviating bar 5 causes the pivoting of lever 18 about its pivot pin 21 of an angle $\beta$: the forces exerted on the bar 5 are compensated by the extension of draw-springs 22 and 23. Said pivoting movement of lever 18 moves stop member 20 away from its initial position and releases the flange 19. Then the tension exerted on band 1 causes the rotation of supply reel 3.

It is therefore clear from the foregoing that the device according to the invention makes it possible, in a first stage, to tension band 1 when said band starts to be unrolled, and this before even a second stage, when braking stop 20 is released and the band 1 can move forward.

This particular disposition of the invention therefore eliminates the need for the labelling machine to comprise unnecessary accessories, and on the contrary gives it a compact structure with improved working properties, due to a constant tensioning of the band 1 while said band is fed to the distribution plate 6.

The invention is in no way limited to the description given hereinabove and on the contrary covers any variant thereof. It is for example understood that the deviating bar 5 mounted on the pivoting place, which is characteristic of the invention, may not be the first deviating bar and that it is possible, without departing from the scope of the invention, to introduce before said movable bar 5, a fixed bar to form the sharp angle.

What is claimed is:

1. A labelling machine of the type comprising a supply reel, supplying a band carrying labels, a receiving reel for said band after stripping of the labels, a distribution plate placed close to two deviating bars deviating the band so that said band forms a sharp angle in its path between the first deviating bar, the distribution plate and the second deviating bar, and a band pulling system placed after the second deviating bar, wherein said machine comprises:

(a) an arm on one end of which is fixed the first deviating bar, said arm being mounted for pivoting about a first pin, (b) a piece on which are mounted, on the one hand a stop member, and on the other hand, the first pin, said piece being itself mounted for pivoting about a second pin, fixed on a frame of the machine, (c) a first return means, fast with the pivoting piece and the frame of the machine and capable of causing the piece to pivot about the second pin so that the stop member is directly or indirectly applied on a pivoting spindle of the supply reel, (d) a second return means, fast with the pivoting piece and the arm, and capable of causing the arm to pivot about the first pin, in such a way as to bring the first deviating bar closer to the stop member, and (e) another stop member to restrict the pivoting movement therefore about the first pin.

* * * * *